(12) United States Patent
Martchovsky

(10) Patent No.: US 7,307,626 B2
(45) Date of Patent: Dec. 11, 2007

(54) CAPACITIVE TOUCH SENSOR

(75) Inventor: Detelin Martchovsky, Fremont, CA (US)

(73) Assignee: Tyco Electronics Corporation, Middletown, PA (US)

( * ) Notice: Subject to any disclaimer, the term of this patent is extended or adjusted under 35 U.S.C. 154(b) by 490 days.

(21) Appl. No.: 11/046,372

(22) Filed: Jan. 27, 2005

(65) Prior Publication Data

US 2005/0162408 A1    Jul. 28, 2005

Related U.S. Application Data

(60) Provisional application No. 60/539,832, filed on Jan. 27, 2004.

(51) Int. Cl.
*G09G 5/00* (2006.01)

(52) U.S. Cl. .................. 345/174; 178/18.05; 178/18.06

(58) Field of Classification Search ................ 345/173, 345/174; 178/18.01, 18.05, 18.06, 18.07
See application file for complete search history.

(56) References Cited

U.S. PATENT DOCUMENTS

| | | | |
|---|---|---|---|
| 5,730,165 A | 3/1998 | Philipp | |
| 5,777,607 A * | 7/1998 | Koolen | 345/174 |
| 6,081,259 A * | 6/2000 | Teterwak | 345/173 |
| 6,288,707 B1 | 9/2001 | Philipp | |
| 6,466,036 B1 | 10/2002 | Philipp | |
| 6,535,200 B2 * | 3/2003 | Philipp | 345/168 |
| 6,909,426 B2 * | 6/2005 | Chao et al. | 345/173 |
| 2003/0132922 A1 | 7/2003 | Philipp | |

* cited by examiner

*Primary Examiner*—Kent Chang

(57) ABSTRACT

A method for determining the location of a touch made to a capacitive touchscreen in which the touchscreen includes a plurality of electrodes distributed around a touch sensitive area of the touchscreen, and a control circuit connected to the plurality of electrodes. The control circuit includes circuitry for measuring capacitance on the sensor, and provides a control signal indicating coordinates of a touch position on the screen, and includes multiple input/output connections, and multiple sub-circuits, where one sub-circuit is associated with one electrode. The method includes using a first switching element of each sub-circuit, when closed, to connect an electrode to an energy storage element which is in turn connected to a reference or ground, and using a second switching element, when closed, to connect the energy storage element to a detector. The method includes charging an electrode to a set voltage level when the associated first and second switching elements are closed and opened, respectively, and measuring energy in the energy storage element with the detector when the first and second switching elements are opened and closed, respectively.

6 Claims, 6 Drawing Sheets

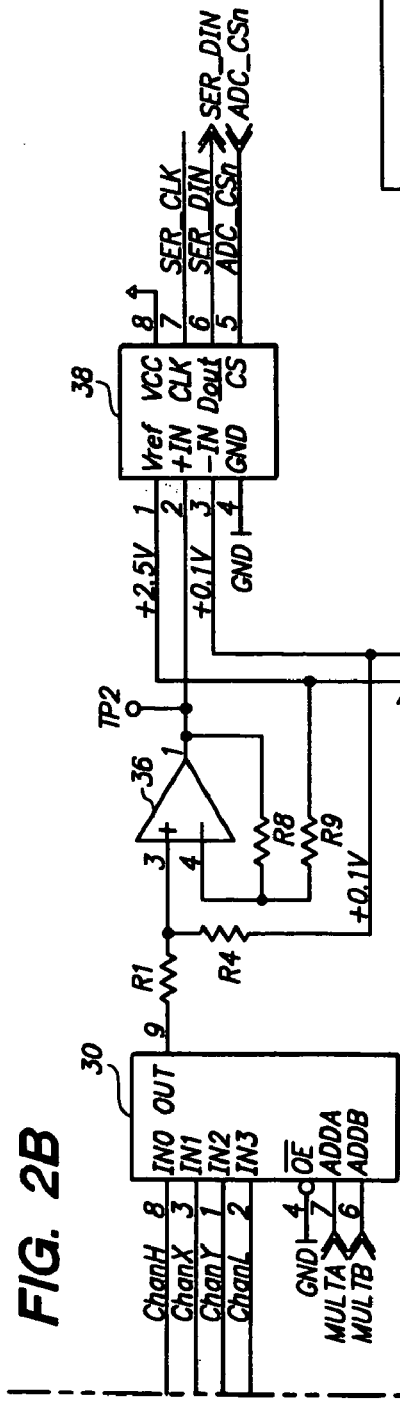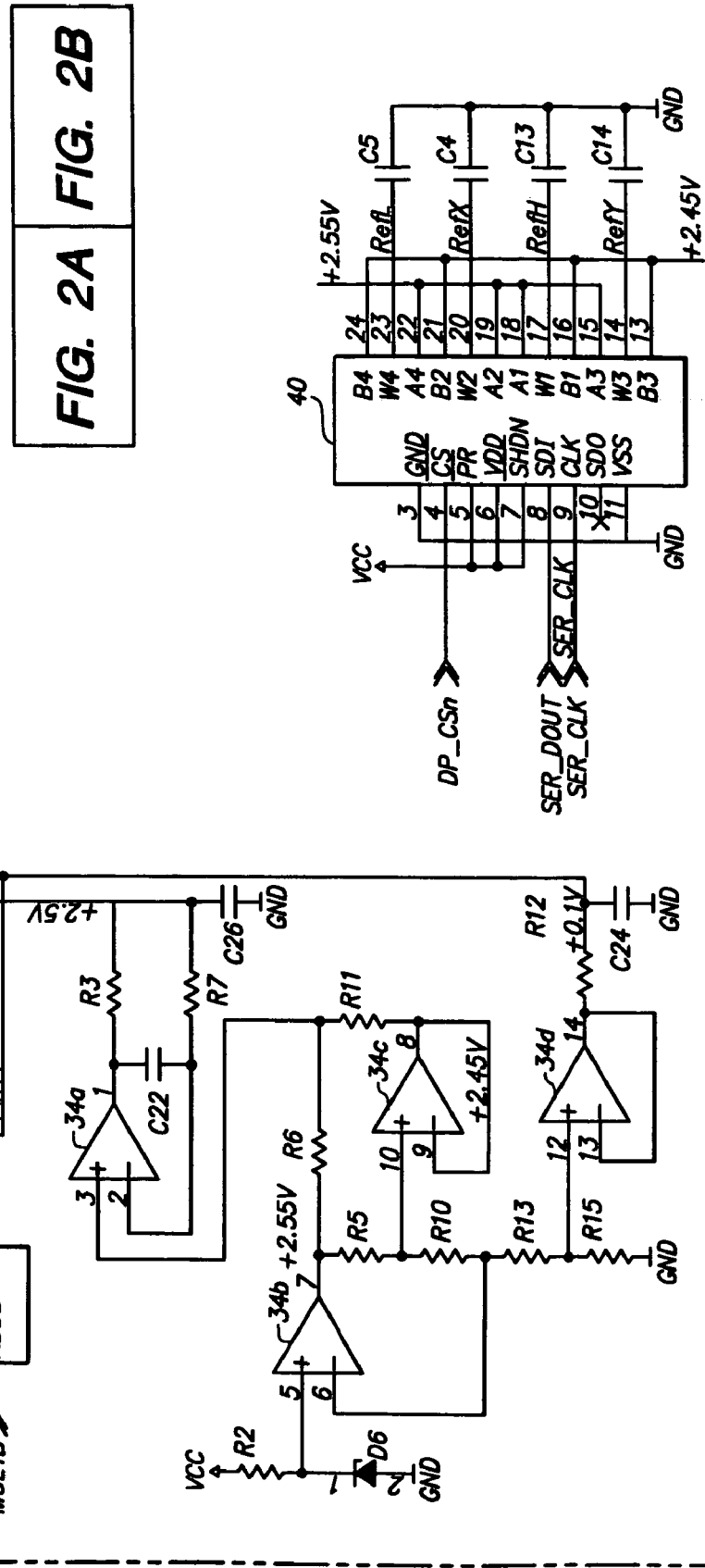
FIG. 2A | FIG. 2B
FIG. 2A
FIG. 2B

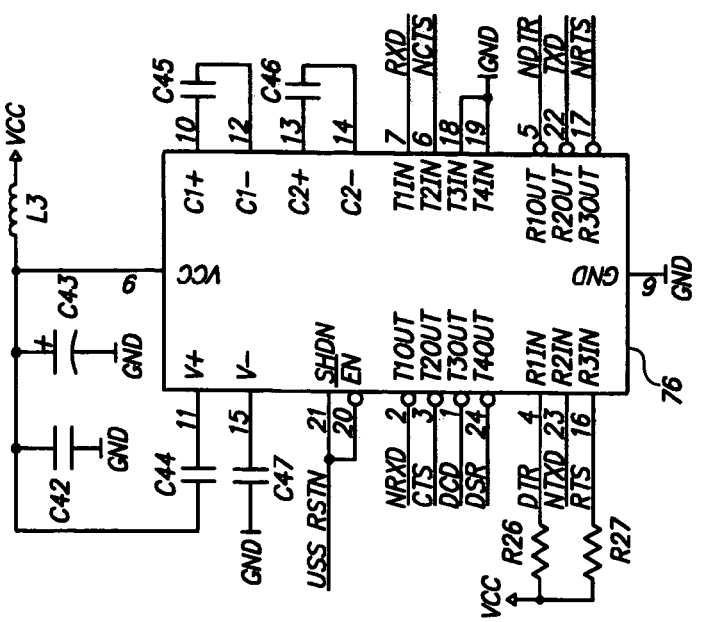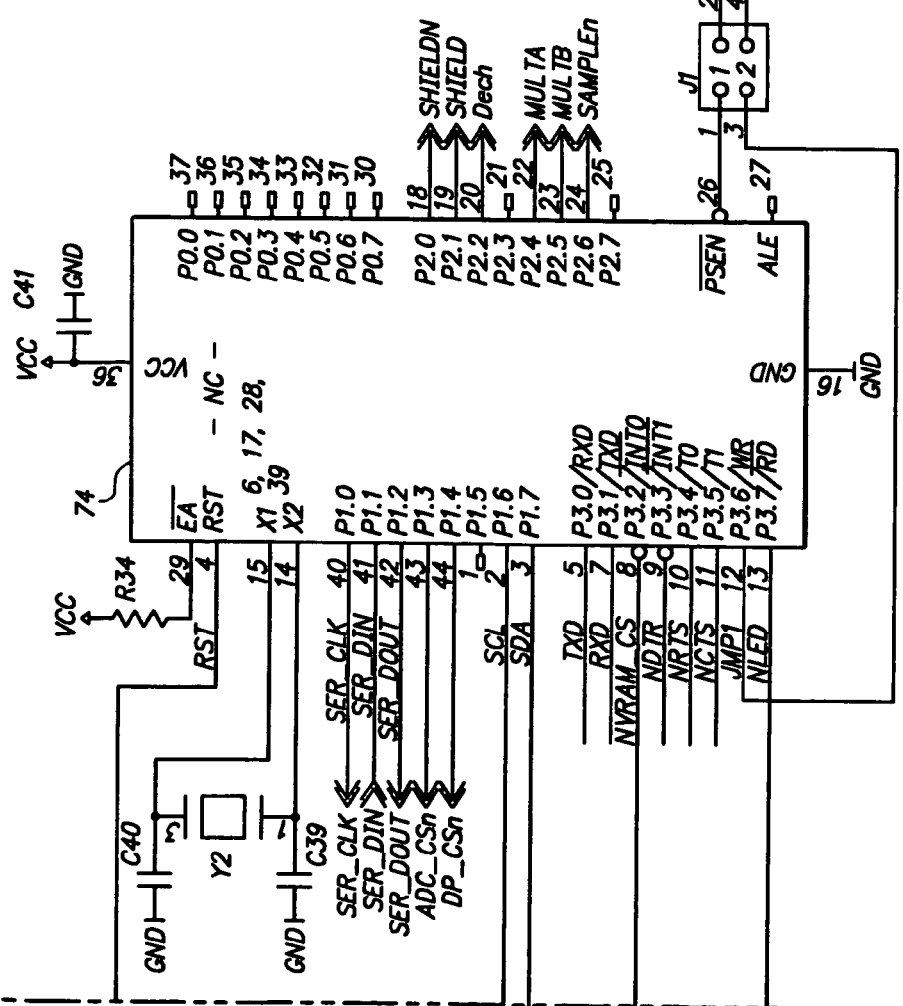

CAPACITIVE TOUCH SENSOR

CROSS-REFERENCE TO RELATED APPLICATIONS

This application is an application under 35 USC 111 (a) and claims priority under 35 USC 119 from Provisional Application Ser. No. 60/539,832, filed Jan. 27, 2004 under 35 USC 111 (b). The disclosure of that provisional application is incorporated herein by reference.

BACKGROUND OF THE INVENTION

1. Field of the Invention

This invention relates to touch sensors, and more particularly to capacitive touchscreens and to circuits for use and methods for use in capacitive touchscreens that can provide a control signal providing information about the location of a touch on the sensor.

2. Introduction to the Invention

Touchscreens are commonly used as interfaces for computers and other electronic devices, such as hand held personal digital assistants, kiosks, games, point-of-sale devices, etc.

A capacitive touchscreen sensor is one type of sensor for a touchscreen that operates by capacitive shunting of current through a dielectric layer to a user's finger and then through the user's body to ground. Other grounded elements, such as a grounded stylus, may also be used. This type of sensor typically includes a capacitive sensing circuit with multiple electrodes, each producing an electric field across a touch sensitive area of the sensor. The sensing circuit can be adjacent to a transparent protective sensor substrate, e.g., glass. A touch near an electrode affects the electric field and creates a signal that can be detected by the sensing circuit. A set of electrical connections is made between the sensing circuit and a controller that resolves the signals to determine the location of the touch on the sensor. The coordinates of the location may then be communicated to another processor such as a host computer for further processing.

In a typical capacitive sensor, a stack including multiple transparent layers is used, including a substrate layer, a resistive layer, e.g., indium tin oxide (ITO), on top of the substrate, and a layer acting as a shield on the bottom of the substrate. Silver frit traces are a commonly used element to couple the resistive layer to detection electronics.

BRIEF SUMMARY OF THE INVENTION

The present invention relates to a capacitive touchscreen sensor. The touchscreen includes a plurality of electrodes distributed around a touch sensitive area of the touchscreen, and a control circuit connected to the plurality of electrodes, wherein the control circuit includes circuitry for measuring capacitance on the sensor, and provides a control signal indicating coordinates of a touch position on the screen.

In one aspect, the present invention provides a capacitive sensor having multiple electrodes, a resistive layer, and a circuit for charging the resistive layer and sensing capacitance on the layer. The circuit comprises multiple input/output connections to the screen and multiple sub-circuits, where one sub-circuit is associated with one electrode. Each sub-circuit includes a pair of switching elements, an energy storage element, and a detector. In each sub-circuit, a first switching element, when closed, connects an electrode to the energy storage element which is in turn connected to ground. The second switching element, when closed, connects the energy storage element to the detector. In a preferred embodiment, the first switching element is closed and the second switching element is open when the electrodes are being charged to a set voltage level, and the first switching element is open and the second switching element is closed when the detector is measuring an energy storage level of the energy storage device.

In another aspect, the present invention provides a method for measuring a location of a touch to a capacitive sensor, wherein the sensor has multiple electrodes, a resistive layer, and a circuit for charging the resistive layer and sensing capacitance on the layer. The circuit includes multiple input/output connections, and multiple sub-circuits, where one sub-circuit is associated with one electrode. Each sub-circuit includes a pair of switching elements, an energy storage element and a detector. The method includes using a first switching element of each sub-circuit, when closed, to connect an electrode to an energy storage element which is in turn connected to ground, and using a second switching element, when closed, to connect the energy storage element to a detector. The method includes charging an electrode to a set voltage level when the associated first and second switching elements are closed and opened, respectively, and measuring energy in the energy storage element with the detector when the first and second switching elements are opened and closed, respectively.

In a further aspect, the present invention provides a capacitive sensor having multiple electrodes, a resistive layer and a circuit for charging the resistive layer and sensing capacitance on the layer, wherein the circuit includes a detector for measuring charge, and an analog to digital converter for digitizing the output of the detector. The circuit includes a capability for automatically setting a gain control by using a plurality of most significant bits of the analog to digital converter to determine when a detector is saturated.

In another aspect, the present invention provides a capacitive sensor having multiple electrodes, a resistive layer and a circuit for charging the resistive layer and sensing capacitance on the layer, wherein the circuit includes a plurality of detectors for measuring charge and only one power supply having a single polarity, and operates using a virtual ground set to a voltage greater than 0V but less than 5V. In a preferred embodiment, a digital potentiometer is used to tune the voltage of reference inputs to the charge detectors so that the potential present on all of the electrodes is the same.

In another aspect, the present invention provides a method for detecting a touch on a capacitive touch sensor, wherein the method includes providing a circuit for charging and discharging the sensor through multiple electrodes electrically connected to the sensor. The circuit includes a sub-circuit corresponding to each electrode. The method includes first charging all electrodes to a first potential and measuring an extent of charge for some of the sub-circuits at a desired time after charging. The method then includes charging all electrodes to a second potential and measuring an extent of charge for some of the sub-circuits, which may be the same or different from those charged to the first potential.

BRIEF DESCRIPTION OF THE DRAWINGS

The drawings illustrate the design and utility of a preferred embodiment of the present invention, in which similar elements are referred to by common reference numerals. In order to better appreciate the advantages and objects of the present invention, reference should be made to the accompanying drawings that illustrate this preferred embodiment. However, the drawings depict only one embodiment of the invention, and should not be taken as limiting its scope. With this caveat, the invention will be described and explained with additional specificity and detail through the use of the accompanying drawings in which.

DETAILED DESCRIPTION OF THE INVENTION

Figure 1A:
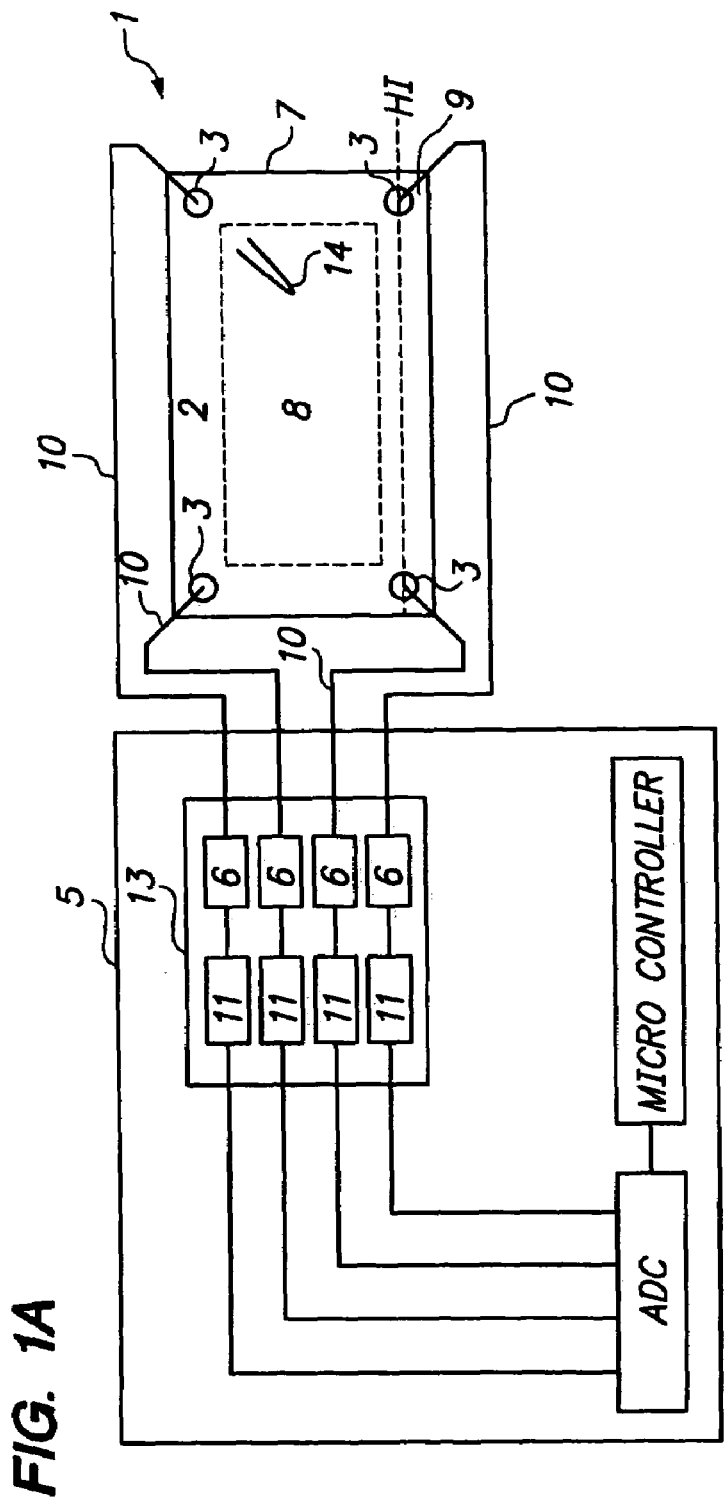
FIG. 1A is a schematic diagram of a capacitive touchscreen of the present invention.
Figure 1B:
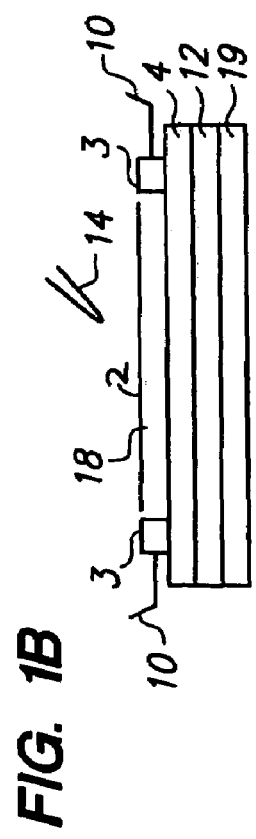
FIG. 1B shows a cross-sectional view of a capacitive touchscreen shown in FIG. 1A along line H1.

Referring to FIGS. 1A and 1B, the present invention provides a capacitive touchscreen sensor 1 having a surface 2, multiple electrodes 3, a resistive layer 4 and a control circuit 5 which includes a circuit 13 for charging the resistive layer 4 and sensing capacitance. As shown in FIG. 1B, the sensor is comprised of a stack of layers, with a substrate 12 (e.g., glass) and a transparent resistive layer 4 (e.g., ITO) to which the electrodes 3 are attached at the corners 9. A thin dielectric layer 18 is on top of the resistive layer 4, and a touch is made to the sensor by a finger or grounded stylus 14, forming a capacitance between the resistive layer 4 and a ground for the finger or stylus. In some embodiments, an additional conductive layer 19 is added to the bottom of the substrate as a guard electrode. The control circuit 5 comprises multiple input/output channels 6 that are connected to the screen. The electrodes are located around a periphery 7 of a sensing region 8 of the sensor and preferably the electrodes are located at corners 9 of the resistive layer. In a preferred embodiment, the resistive layer is substantially planar having four sides and four corners, and has four electrodes connected to it. Each electrode is electrically connected (e.g., with a wire 10) to a corresponding input/output channel 6 and charging and capacitive sensing sub-circuit 11. Preferably there are four sub-circuits. If the resistive layer is charged to a potential, and a user's finger then touches the surface of the sensor, the capacitance is changed, and the change in capacitance can be sensed by the sub-circuits. By using signals output from the sub-circuits, coordinates indicating the position of the touch can be determined.

Figure 2A:
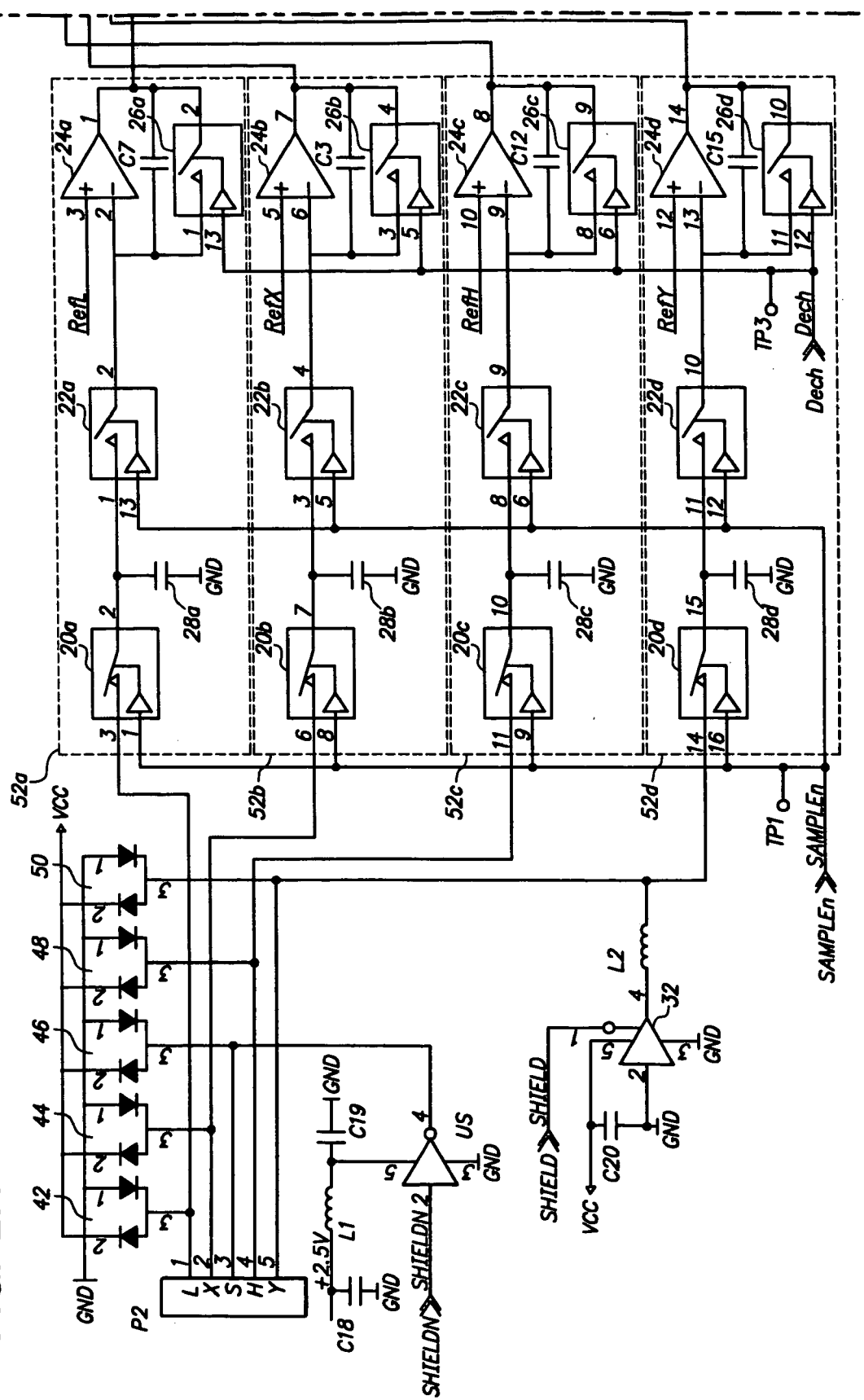
FIG. 2 is a circuit layout for a controller for a capacitive sensor of the present invention.

FIG. 2 illustrates a first set of a plurality of switching elements (20a, 20b, 20c, 20d), each element having an open (nonconducting) state and a closed (conducting) state and including a control input; a second set of a plurality of switching elements (22a, 22b, 22c, 22d), each element having an open (nonconducting) state and a closed (conducting) state and including a control input; a plurality of charge detectors (24a, 24b, 24c, 24d) such as operational amplifiers; a third set of a plurality of switching elements (26a, 26b, 26c, 26d), each element having an open (nonconducting) state and a closed (conducting) state and including a control input; a plurality of energy storage elements (28a, 28b, 28c, 28d) which may be, for example, capacitors; an analog multiplexer 30; a single bus buffer (3 state) 32; a plurality of operational amplifiers (34a, 34b, 34c, 34d, 36); an analog to digital converter (ADC) 38; a digital potentiometer 40; and a plurality of series-connected Schottky diode pairs 42, 44, 46, 48, and 50.

Referring to FIG. 2, the present invention provides a circuit having five input/output channels (L, X, S, H, Y). Four of the five input/output channels connect an electrode to a corresponding sub-circuit (52a, 52b, 52c, 52d), wherein each sub-circuit includes a charging and a capacitive sensing portion. Each sub-circuit 52 comprises a first switching element 20, a first energy storage element 28, such as a capacitor connected to ground, a second switching element 22, and a charge detector 24. The outputs of each of the charge detectors 24 are connected to a multiplexer 30, that is in turn connected to an analog to digital converter 38 which then outputs signals which are further processed to provide information back to a computer. Each switching element has two states, one open (nonconducting) and one closed (conducting), and has a control input. Examples of switching elements that can be used are transistors. In a first state, the first switching element in each sub-circuit is in a closed state and connects its associated electrode to a capacitor (which is in turn connected to ground) while the second switching element is in an open state. In a second state, the second switching element in each sub-circuit is in a closed state and connects the capacitor to a charge detector while the first switching element is in an open state. Examples of charge detectors include operational amplifiers having a reference input.

The invention includes a method in which the electrodes are charged to a specified potential (e.g., +2.5V) relative to a reference (e.g., ground or a virtual ground set to some voltage, e.g., +2.5V) using a voltage source, preferably by sending short current pulses (e.g., having duration of about 1 microsecond). Preferably all electrodes are charged simultaneously. Once an electrode has reached the specified potential, the first switching element 20a of the corresponding sub-circuit 52a is closed while at the same time the second switching element 22a in the same sub-circuit is opened. A touch to the sensor provides a path to ground, so that the voltage on the electrodes can partially discharge through the first energy storage element 28a. The degree to which the energy storage element 28a in each sub-circuit is discharged will depend on the location of the touch on the touch sensitive area of the sensor. The first switching element 20a of the sub-circuit is subsequently opened and the second switching element 22a is closed after a desired time (e.g., 1 microsecond). With the sub-circuit in this configuration, current is supplied back to the first energy storage element 28a and the current that is used to recharge the energy storage element is measured by the charge detector 24a. Measurements made in this manner for the various channels are then digitized by an analog to digital converter and used to determine the location and other characteristics of touches to the sensor.

The signal outputs of the multiple sub-circuits are sent to an analog multiplexer 30 which in turn sends the signals to an ADC 38, preferably through an amplifier 36. The ADC 38 is preferably 12-bit, wherein the first three bits are considered most significant bits (MSB). The ADC 38 digitizes voltages present at each of the charge detectors 24.

A circuit and method are provided to automatically set a gain control to enable the connection of various screens to the circuit. The sub-circuits 52 of the present invention will charge until any one of the charge detectors 24 saturates. Once the controller circuit 5 detects that any one of the charge detectors 24 is saturated, it will stop charging automatically. The circuit can efficiently detect that a charge detector 24 is saturated by utilizing two programs in its firmware, the first program operating to sense the three most significant bits of the ADC, and the second program operating to measure and digitize voltage present at a charge detector 24. The second program does not operate until all of the three most significant bits are equal to one for one of the charge detectors, i.e., that the value in the first 3 registers of the ADC 38 exceeds a threshold. If all 3 most significant bits are equal to one for a charge detector, then the voltage on the charge detector has reached a level indicating the charge detector is saturated and the circuit will then stop charging. By using these two programs in the firmware driving the circuit, the amount of measurement time required by the 12-bit ADC is minimized so that the circuit can operate faster. By automatically stopping the charging in the circuit, automatic gain control of the circuit is implemented. This reduces or eliminates the need for manually tuning a circuit for optimum operation when coupled to different sizes of screens, and the need for fine tuning a circuit that arises because of subtle differences between screens.

The circuits of the present invention can operate using a virtual ground set to some positive voltage between 0V and 5V, preferably to +2.5V. By using a virtual ground set at a positive voltage, a single polarity power supply (e.g., +5V for a +2.5V virtual ground) is the only required power source for the circuit.

In a preferred embodiment the potential at each of the electrodes (which are positioned around the periphery of the sensing area of the sensor, e.g., at the corners) will be the same. This will provide improved linearity for a more uniform and less distorted display. A circuit and method are provided to set the potential of all electrodes of a capacitive sensor to be the same. Each charge detector 24 of each sub-circuit 52 has a reference input (RefL, RefX, RefH, RefY). The voltage used as the reference for the circuit will generally have some variability as it is input into the charge detectors. For example, the variability is about 60 mV on a 2.5V reference, i.e., the reference voltage range is about 2.47-2.53V. A digital potentiometer 40 can be used to finely tune the reference voltage (e.g., 2.5V) as it is supplied to the reference inputs RefL, RefX, RefH, RefY of the respective charge detectors 24 so that the voltage on all the electrodes is the same. In addition the potentiometer 40 can be used to tune the reference voltage to adjust for any small DC offsets (e.g., 5-10 mV) that may be present at the output of the charge detectors or at the ADC 38.

In a preferred scheme for measuring capacitance information from the sub-circuits in a sensor of the present invention, the electrodes are charged to a selected voltage (e.g., +2.5V) using a series of approximately 1 microsecond pulses, with the first switches 20 closed and the second switches 22 opened, and the capacitance of a subset of the electrodes (e.g., two of four) is measured by the detectors of the associated sub-circuits with the first switching elements opened and the second switching elements closed. The electrodes and therefore the screen are then discharged to ground using a gate 32, and the capacitance of the remainder of the electrodes is then measured. Thus the discharging takes place between measurements of the multiple electrodes, thereby making the duty cycle approximately 50%. One advantage of this scheme is that the EMI produced by the circuit can be reduced.

Figure 3A:
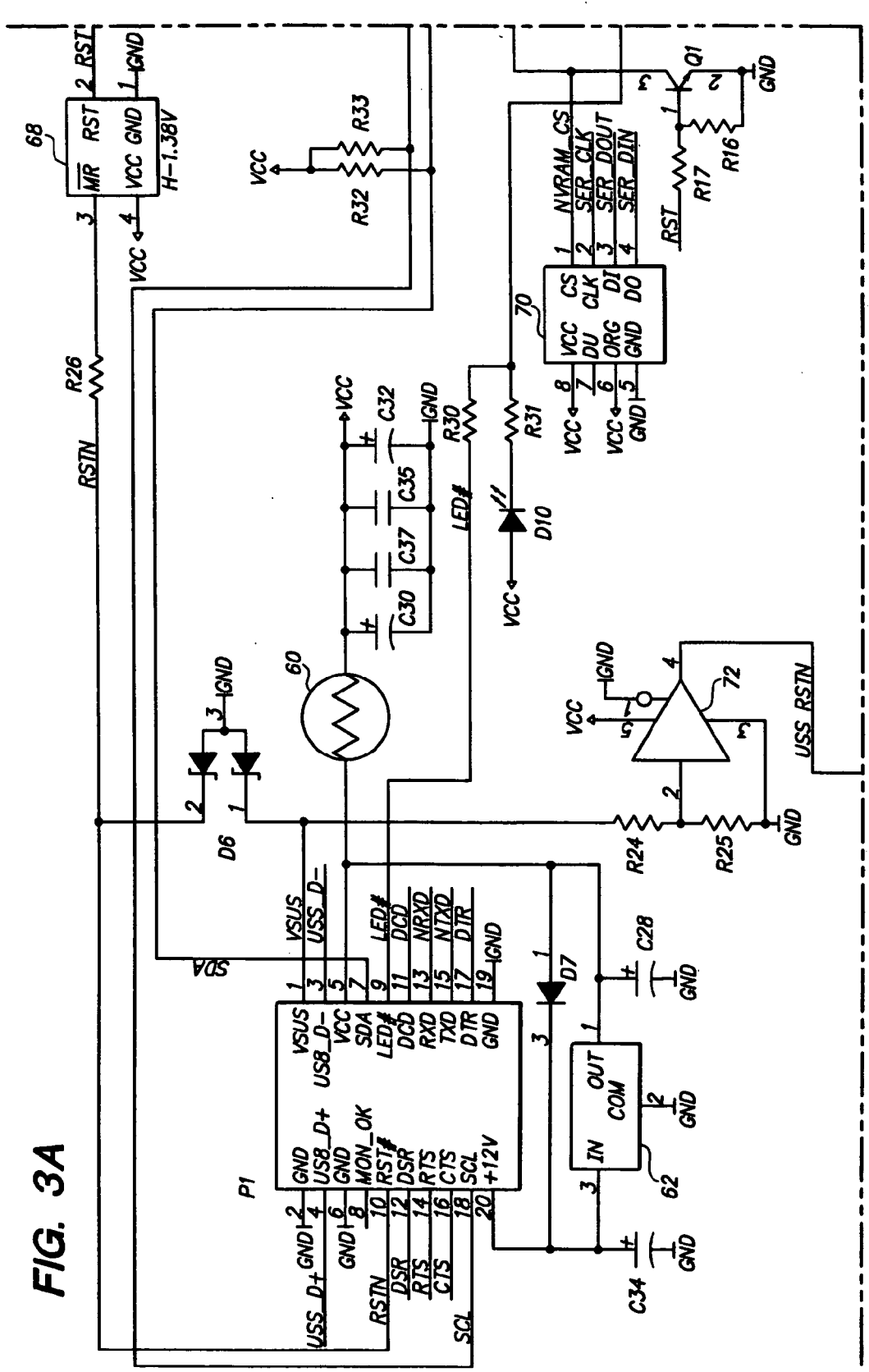
FIG. 3 is a circuit layout for an electronic circuit for use in a touchscreen system including a touchscreen sensor, including a configuration that allows data from either a universal serial bus connector or an RS232 serial connector to be transmitted to a microcontroller.
Figure 3B:
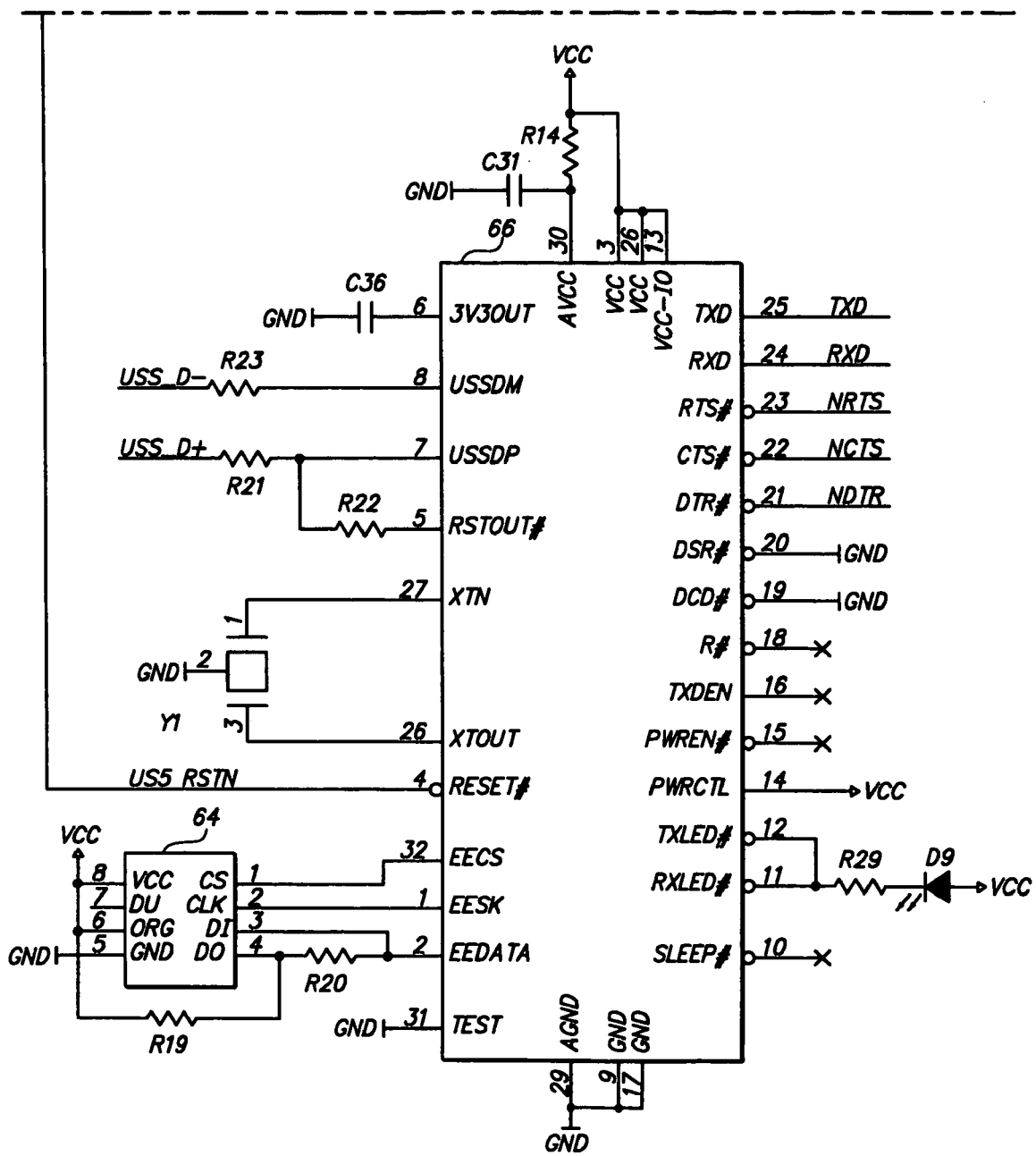

FIG. 3 is a circuit layout for an electronic circuit for use in a touchscreen system including a touchscreen sensor (e.g., a capacitive touch sensor) for transmitting data between a microcontroller and the sensor. FIG. 3 includes the following elements: a resistor 60, preferably a polymeric positive temperature coefficient device; a regulator 62, preferably a voltage and current regulator; an EPROM chip 64; an integrated circuit capable of converting serial RS232 data to universal serial bus data 66; a voltage monitor 68; an EPROM chip 70; a buffer 72, preferably a 3-state single bus buffer; a microcontroller 74; and a serial (RS232) line driver/receiver 76.

A controller circuit for a sensor as shown in FIG. 3 transfers data between a microcontroller or computer and the sensor circuit. It is desired to use either an RS232 serial connection or a universal serial bus (USB) to transfer the data. Integrated circuits exist which can convert RS232 serial input to a USB compatible input. An example of such an integrated circuit is the FT232BM, available from FTDI. However, in many cases, it is desirable to have the controller circuit be able to use either an RS232 serial connection or a USB connection to transfer data A circuit can be configured to accommodate both data interface protocols by including an integrated circuit designed to convert RS232 input to USB input (66) and an RS232 line driver/receiver (76), and using a three-state bus buffer (72) to send a control signal to enable either the integrated circuit or the RS232 line driver to communicate with the microcontroller (74).

The foregoing detailed description of the invention includes passages which are chiefly or exclusively concerned with particular parts or aspects of the invention. It is to be understood that this is for clarity and convenience, that a particular feature may be relevant in more than just the passage in which it is disclosed, and that the disclosure herein includes all the appropriate combinations of information found in the different passages. Similarly, although the various figures and descriptions thereof relate to specific embodiments of the invention, it is to be understood that where a specific feature is disclosed in the context of a particular figure, such feature can also be used, to the extend appropriate, in the context of another figure, in combination with another feature, or in the invention in general.

It will be understood that the above-described arrangements of apparatus and the methods therefrom are merely illustrative of applications of the principles or this invention and many other embodiments and modifications may be made.

What is claimed is:

1. A method for determining the location of a touch made to a capacitive touchscreen sensor which sensor comprises
   (1) a touchscreen comprising a touch-sensitive region comprising a resistive layer,
   (2) a plurality of electrodes distributed around the touch sensitive region, and
   (3) a control circuit for charging the resistive layer, sensing capacitance on the resistive layer, and providing a control signal indicating coordinates of touch position on the touchscreen, said circuit
      (a) being connected to the plurality of electrodes, and
      (b) comprising multiple input/output connections to the touchscreen and multiple sub-circuits, each sub-circuit (i) being associated with one electrode, and (ii) comprising first and second switching elements, an energy storage element, a detector for measuring charge, and an analog to digital converter for digitizing the output of the detector, arranged such that for each sub-circuit, the first switching element, when closed, connects an electrode to the energy storage element and the second switching element, when closed, connects the energy storage element to the detector, said method comprising
- (A) closing a first switching element of each sub-unit while a second switch element is open so as to connect an electrode to an energy storage element, thus charging the electrode to a set voltage level,
- (B) opening the first switching element while closing the second switching element to connect the energy storage element to a detector, thus transferring energy from the detector to the energy storage element in an amount equal to that used to charge the electrode,
- (C) repeating steps (A) and (B) until saturation of a detector in one sub-unit occurs, thus stopping the charging of the detectors in all sub-units,
- (D) measuring accumulated energy in the detector of each sub-circuit, and
- (E) using the measurement of accumulated energy to determine coordinates of a touch position on the touchscreen.

2. The method of claim 1 wherein the set voltage level is a virtual ground.

3. The method of claim 2 wherein the electrodes are charged to a specified potential relative to a reference.

4. The method of claim 3 wherein the specified potential is +2.5V.

5. The method of claim 1 wherein a gain control is automatically set by using a plurality of most significant bits of the analog to digital converter to determine saturation of the detector.

6. The method of claim 1 wherein in each sub-circuit the first switching element and the second switching element are electrically connected in series and to a capacitor which is connected to ground.

* * * * *